US012581166B2

(12) United States Patent
Dong et al.

(10) Patent No.: US 12,581,166 B2
(45) Date of Patent: Mar. 17, 2026

(54) METHOD OF RECOMMENDING LIVE BROADCASTING ROOM, APPARATUS, DEVICE, AND MEDIUM

(71) Applicant: Beijing Youzhuju Network Technology Co., Ltd., Beijing (CN)

(72) Inventors: Shihan Dong, Beijing (CN); Jiali Hu, Beijing (CN); Mengjie Zhao, Beijing (CN); Liya Li, Beijing (CN); Yunfei Mao, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 16 days.

(21) Appl. No.: 18/391,584

(22) Filed: Dec. 20, 2023

(65) Prior Publication Data

US 2024/0214638 A1 Jun. 27, 2024

(30) Foreign Application Priority Data

Dec. 27, 2022 (CN) .......................... 202211691691.5

(51) Int. Cl.
H04N 21/466 (2011.01)
H04N 21/2187 (2011.01)

(52) U.S. Cl.
CPC ..... H04N 21/4668 (2013.01); H04N 21/2187 (2013.01)

(58) Field of Classification Search
CPC .......... H04N 21/4668; H04N 21/2187; H04N 21/4826; H04N 21/251; H04N 21/4312; H04N 21/4665

(Continued)

(56) References Cited

U.S. PATENT DOCUMENTS

| 10,223,740 | B1 | 3/2019 | Gore et al. | |
| 2010/0304704 | A1* | 12/2010 | Najafi | H04M 1/665 |
| | | | | 455/562.1 |

(Continued)

FOREIGN PATENT DOCUMENTS

| CN | 108900923 A | 11/2018 |
| CN | 109379608 A | 2/2019 |

(Continued)

OTHER PUBLICATIONS

"How can I view more live content of Kuaishou Live Plaza?"; https://jingyan.baidu.com/article/046a7b3e1af17cb8c37fa936.html; Baidu; Mar. 2020; accessed Mar. 13, 2024; 7 pages.

(Continued)

*Primary Examiner* — Cynthia M Fogg
(74) *Attorney, Agent, or Firm* — BakerHostetler

(57) ABSTRACT

The present disclosure provides a method of recommending a live broadcasting room, an apparatus, a device and a medium. The method includes: displaying a live broadcasting room recommendation identifier on a live broadcasting page of a current live broadcasting room in response to the current live broadcasting room satisfying a preset condition, a recommendation content label displayed in the live broadcasting room recommendation identifier being determined according to a target object in the current live broadcasting room; displaying a live broadcasting room recommendation interface corresponding to the recommendation content label in response to a triggering operation on the live broadcasting room recommendation identifier, the live broadcasting room recommendation interface including live broadcasting room identifiers of a plurality of recommended live broadcasting rooms, a display object set in the plurality of recommended live broadcasting rooms matching with the recommendation content label.

20 Claims, 8 Drawing Sheets

(58) Field of Classification Search
USPC ........................................................ 725/44
See application file for complete search history.

(56) References Cited

U.S. PATENT DOCUMENTS

| | | | |
|---|---|---|---|
| 2018/0160176 A1* | 6/2018 | Millar .............. H04N 21/47202 |
| 2021/0314639 A1* | 10/2021 | Li .................... H04N 21/26603 |
| 2022/0060770 A1* | 2/2022 | Li ........................ H04N 21/251 |
| 2022/0301005 A1 | 9/2022 | Tang |
| 2022/0303605 A1 | 9/2022 | Zhang |
| 2023/0063711 A1* | 3/2023 | Liu ...................... G06Q 10/087 |
| 2024/0126413 A1* | 4/2024 | Zheng ................ G06Q 30/0282 |

FOREIGN PATENT DOCUMENTS

| | | | | |
|---|---|---|---|---|
| CN | 111079012 A | * | 4/2020 | ........... G06F 3/0485 |
| CN | 111159562 A | | 5/2020 | |
| CN | 305912979 S | | 7/2020 | |
| CN | 109379608 B | * | 7/2021 | ....... H04N 21/25891 |
| CN | 113382279 A | | 9/2021 | |
| CN | 113395537 A | | 9/2021 | |
| CN | 113824979 A | * | 12/2021 | ........... H04N 21/472 |
| CN | 114071179 A | | 2/2022 | |
| CN | 114547436 A | | 5/2022 | |
| CN | 115022653 A | | 9/2022 | |
| CN | 113382279 B | * | 11/2022 | ......... H04N 21/4667 |
| CN | 113099249 B | * | 8/2023 | ......... H04N 21/2187 |
| JP | 2016-197411 A | | 11/2016 | |
| JP | 2017-199352 A | | 11/2017 | |
| JP | 2021-034802 A | | 3/2021 | |

OTHER PUBLICATIONS

Japan Patent Application No. 2024-575348; Notice to Grant a Patent; dated Jan. 27, 2026; 5 pages.

* cited by examiner

S101 displaying a live broadcasting room recommendation identifier on a live broadcasting page of a current live broadcasting room in response to the current live broadcasting room satisfying a preset condition, a recommendation content label displayed in the live broadcasting room recommendation identifier is determined according to a target object in the current live broadcasting room

S102 displaying a live broadcasting room recommendation interface corresponding to the recommendation content label in response to a triggering operation on the live broadcasting room recommendation identifier, the live broadcasting room recommendation interface includes a display object set in the plurality of recommended live broadcasting rooms matches with the recommendation content label

FIG. 1

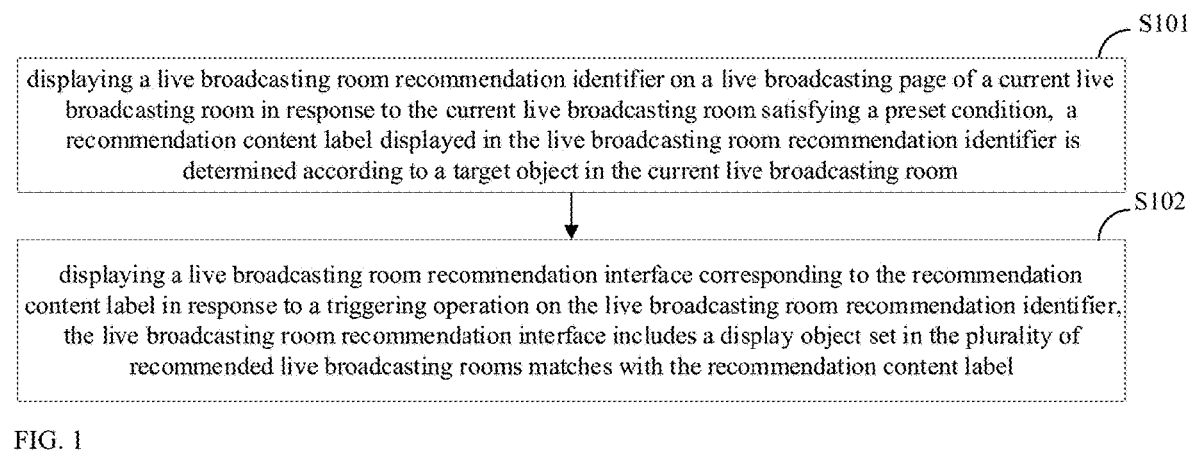

METHOD OF RECOMMENDING LIVE BROADCASTING ROOM, APPARATUS, DEVICE, AND MEDIUM

CROSS-REFERENCE TO THE RELATED APPLICATION

The present application claims priority of Chinese Patent Application No. 202211691691.5, filed on Dec. 27, 2022, the disclosure of which is hereby incorporated herein by reference in its entirety as part of the present disclosure.

TECHNICAL FIELD

Embodiments of the present disclosure relate to a method of recommending live broadcasting room, an apparatus, a device and a medium.

BACKGROUND

With the continuous development of live broadcasting technologies, more and more users share and recommend good things in a manner of live broadcasting. When users watch live videos, more live videos may be triggered and viewed by a certain live broadcasting room. However, more live videos pushed currently may not satisfy the user needs, so that the watching volume is relatively low.

SUMMARY

In view of this, embodiments of the present disclosure provide a method of recommending live broadcasting room, an apparatus, a device, and a medium.

In the first aspect of the present disclosure, the embodiments provide a method of recommending a live broadcasting room, which includes:

displaying a live broadcasting room recommendation identifier on a live broadcasting page of a current live broadcasting room in response to the current live broadcasting room satisfying a preset condition, wherein a recommendation content label displayed in the live broadcasting room recommendation identifier is determined according to a target object in the current live broadcasting room, the target object is at least one display object in a display object set corresponding to the current live broadcasting room;

displaying a live broadcasting room recommendation interface corresponding to the recommendation content label in response to a triggering operation on the live broadcasting room recommendation identifier, wherein the live broadcasting room recommendation interface comprises live broadcasting room identifiers of a plurality of recommended live broadcasting rooms, a display object set in the plurality of recommended live broadcasting rooms matches with the recommendation content label.

In the second aspect of the present disclosure, the embodiments provide an apparatus of recommending a live broadcasting room, which includes:

a first display unit, configured to display a live broadcasting room recommendation identifier on a live broadcasting page of a current live broadcasting room in response to the current live broadcasting room satisfying a preset condition, a recommendation content label displayed in the live broadcasting room recommendation identifier is determined according to a target object in the current live broadcasting room, the target object is at least one display object in a display object set corresponding to the current live broadcasting room;

a second display unit, configured to display a live broadcasting room recommendation interface corresponding to the recommendation content label in response to a triggering operation on the live broadcasting room recommendation identifier, the live broadcasting room recommendation interface comprises live broadcasting room identifiers of a plurality of recommended live broadcasting rooms, a display object set in the plurality of recommended live broadcasting rooms matches with the recommendation content label.

In the third aspect of the present disclosure, the embodiments provide an electronic device, which includes: a processor and a memory;

the memory is configured to store instructions or computer programs;

the processor is configured to execute the instructions or the computer programs in the memory, as to enable the electronic device to perform the method according to the first aspect.

In the fourth aspect of the present disclosure, the embodiments provide a computer-readable storage medium, instructions are stored in the computer-readable storage medium, when the instructions run on a device, the device is caused to execute the method according to the first aspect.

In the fifth aspect of the present disclosure, the embodiments provide a computer program product, the computer program product includes computer programs/instructions, when the computer programs/instructions are executed by a processor, the method according to the first aspect is implemented.

BRIEF DESCRIPTION OF THE DRAWINGS

In order to describe embodiments of the present disclosure more clearly, the embodiments or drawings required in the description are briefly introduced below. Apparently, the drawings in the following description are only some of the embodiments recorded in the present disclosure. For those of ordinary skill in the art, other drawings may also be obtained according to these drawings without paying creative labor.

FIG. 1 is a schematic flow diagram of a method of recommending a live broadcasting room provided by embodiments of the present disclosure;

DETAILED DESCRIPTION

Figure 2A:
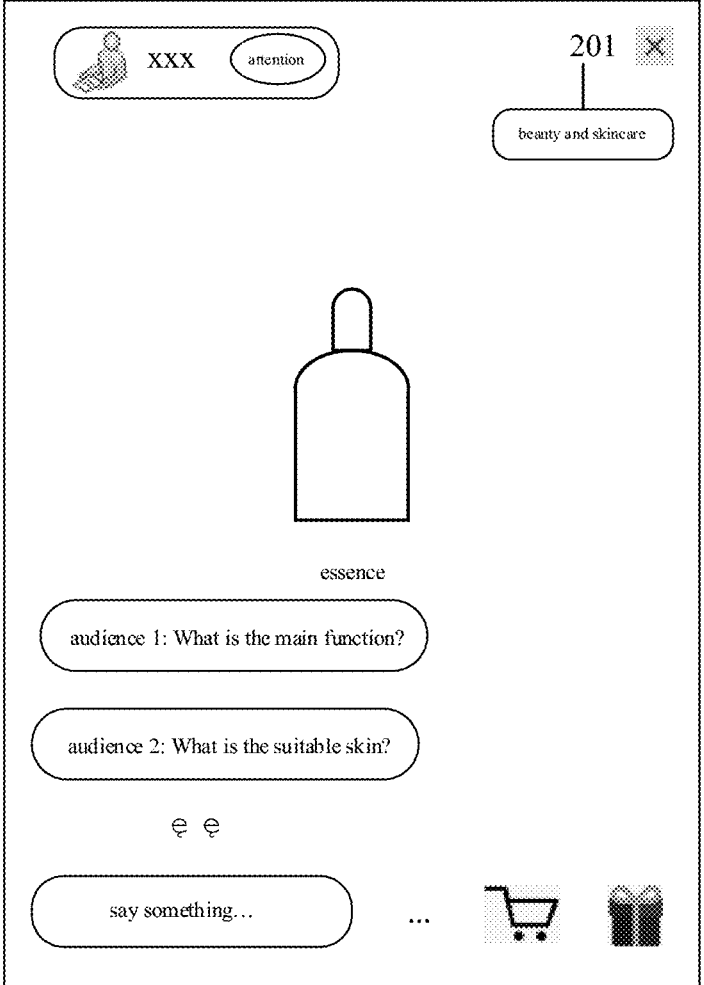
FIG. 2a is a schematic diagram of showing a live broadcasting room recommendation identifier provided by embodiments of the present disclosure.

In order to make those skilled in the art understand the present disclosure better, technical schemes in embodiments of the present disclosure are clearly and completely described below in combination with drawings in the embodiments of the present disclosure. Apparently, the embodiments described are only a part of the embodiments of the present disclosure, not all of the embodiments. Based on the embodiments in the present disclosure, all other embodiments obtained by those of ordinary skill in the art without creative labor shall fall within the scope of protection of the present disclosure.

At present, a user may view more live broadcasting rooms by recommendation control in live broadcasting rooms when browse live broadcasting rooms. However, the lack of correlation between the live broadcasting room recommended for the user by the recommendation control and a content live-broadcasted in the live broadcasting room currently browsed by users may not satisfy user's requirement to view more live broadcasting rooms with similarities to the content live-broadcasted in the current live broadcasting room.

Based on this, an embodiment of the present disclosure provides a method of recommending a live broadcasting room. When users browse a certain live broadcasting room, displaying a live broadcasting room recommendation identifier on a live broadcasting page of a current live broadcasting room, in response to the current live broadcasting room satisfying a preset condition, a recommendation content label displayed in the live broadcasting room recommendation identifier is determined according to a target object in the current live broadcasting room, the target object is at least one display object in a display object set corresponding to the current live broadcasting room; displaying a live broadcasting room recommendation interface corresponding to the recommendation content label in response to a triggering operation on the live broadcasting room recommendation identifier, the live broadcasting room recommendation interface comprises live broadcasting room identifiers of a plurality of recommended live broadcasting rooms, a display object set in the plurality of the recommended live broadcasting rooms matches with the recommendation content label. That is, if the current live broadcasting room satisfies a preset condition, displaying a live broadcasting room recommendation identifier which can includes recommended content identifier on the live broadcasting page corresponding to the current live broadcasting room. Since the recommendation content label is determined according to at least one display object corresponding to the current live broadcasting room, when a client makes a recommendation according to the live broadcasting room recommendation identifier, the recommendation is made according to the recommendation content label on the live broadcasting room recommendation identifier, thus the display object included in the live broadcasting room recommended for user matches with the display object in the current live broadcasting room, so that the user may browse recommended live broadcasting room that is more similar to the current live broadcasting room, user's watching need is satisfied, and user experience is improved.

It may be understood that before the technical schemes of various embodiments in the present disclosure are used, users should be informed of types, use scopes, use scenes and etc. of personal information involved in accordance with relevant laws and regulations in an appropriate manner, and user's authorization should be obtained.

For example, in response to receiving user's active request, a prompt message is sent to the user, as to clearly remind the user that an operation requested to be executed may require acquiring and using the user's personal information. Thus, the user may independently choose whether to provide the personal information to software or hardware such as an electronic device, a disclosure program, a server, or a storage medium that performs the operation of the technical scheme of the present disclosure according to the prompt message.

As an optional but not limited implementation, in response to receiving the user's active request, the mode of sending the prompt message to user may be, for example, a pop-up window mode, and in the pop-up window, the prompt message may be presented in text. In addition, the pop-up window may also carry a selection control for user to choose whether to "agree" or "disagree" so as to provide the personal information to the electronic device.

It may be understood that the above processes of notifying and acquiring user authorization are only schematic and do not constitute limitations on the implementations of the present disclosure. Other modes that satisfy the relevant laws and regulations may also be applied to the implementations of the present disclosure.

In order to conveniently understand the technical schemes provided in the embodiments of the present disclosure, it will be described below in combination with the drawings.

Referring to FIG. 1, this figure is an information display method provided in embodiments of the present disclosure. The method may be executed by a live broadcasting client, and the live broadcasting client may be installed on an electronic device. The electronic device may include a device with a communication function such as a mobile phone, a tablet computer, a notebook computer, a desktop computer, a vehicle terminal, a wearable electronic device, an all-in-one computer, and a smart home device and other devices with communication functions, and a device simulated by a virtual machine or a simulator. As shown in FIG. 1, the method may include the following steps:

S101: displaying a live broadcasting room recommendation identifier on a live broadcasting page of a current live broadcasting room in response to the current live broadcasting room satisfying a preset condition.

In this embodiment, user may switch to view different live broadcasting rooms by the live broadcasting client. When the live broadcasting room watched by the user satisfies the preset condition, the live broadcasting room recommendation identifier may be displayed on the live broadcasting page of the current live broadcasting room. The presentation form of the live broadcasting room recommendation identifier on the live broadcasting page may be a triggerable control, the recommendation content label may be displayed on the live broadcasting room recommendation identifier, and the recommendation content label may be used as a recommendation basis for the user to recommend the live broadcasting room matched with the recommended content. The recommendation content label is determined according to the target object in the current live broadcasting room, and the target object is at least one display object in the display object set corresponding to the current live broadcasting room. The display object may be an item or service in the current live broadcasting room, and the item may be a virtual item or a real item. For example, the display object is a product in a shopping cart of the current live broadcasting room, namely the product sold in the current live broadcasting room. The target object is the display object determined from the display object set corresponding to the current live broadcasting room. Specifically, it may be a certain display object or some display objects in the display object set. How to determine the target object from the display object set may be explained later.

The preset condition may include: the display object in the live broadcasting room is clicked, or the category and/or quantity of the display object in the display object set corresponding to the live broadcasting room is changed. In other words, if a certain display object in the current live broadcasting room is clicked, it is indicated that the current live broadcasting room satisfies the preset condition, and the live broadcasting room recommendation identifier is displayed on the live broadcasting page of the current live broadcasting room. For example, the current live broadcasting room is a shopping live broadcasting room, if a certain product is clicked in the current live broadcasting room, it is indicated that the current live broadcasting room satisfies the preset condition. Alternatively, if the category and/or quantity of the display object in the display object set corresponding to the current live broadcasting room is changed, it is indicated that the current live broadcasting room satisfies the preset condition, and the live broadcasting room recommendation identifier is displayed on the live broadcasting page of the current live broadcasting room. For example, the current live broadcasting room is the shopping live broadcasting room, if the type of the product in the current live broadcasting room is increased or decreased, and/or the inventory quantity or transaction quantity of a certain product is changed, it is indicated that the current live broadcasting room satisfies the preset condition.

In order to conveniently manage and display the display object in the live broadcasting room, a multi-level category label may be set in advance for the live broadcasting room, the level of the multi-level category label is lower, and the type quantity of the display object corresponding to this category label is less. For example, in an e-commerce scene, the display objects are divided into a food category and a beauty category (first-level category label), the food category is further divided into a convenient and fast food category, a nut category, a fresh category (second-level category label) and etc., and the beauty category is further divided into a skincare category, a makeup category (second-level category label) and etc. Certainly, it may also be further divided, which not only facilitates the management of the display objects, but also facilitates the user to screen out the display object matched with this category label in the live broadcasting room according to the different levels of the category labels.

In some embodiments of the present disclosure, the recommendation content label displayed in the live broadcasting room recommendation identifier may be determined by the following modes:

One mode is that, if a category attribute of the target object satisfies a preset category label, a target category label is determined according to the category attribute of the target object, and the target category label is used as the recommendation content label displayed in the live broadcasting room recommendation identifier. The preset category label may be the first-level category label in the above multi-level category label, the specific presentation may be set according to actual application situations, and it is not limited here in this embodiment. Specifically, a plurality of category labels may be preset, if the category attribute of the target object determined in the current live broadcasting room belongs to a certain category label in the plurality of the category labels preset above, the target category label may be determined according to the category attribute of the target object.

For example, the preset category label is the beauty category and the food category, and the beauty category may be subdivided into the skincare category, the makeup category and etc. If the category attribute corresponding to the target object is the skincare category, it is indicated that the category attribute of the target object satisfies the preset category label, then the target category label determined is beauty and skincare, and the recommendation content label displayed in the live broadcasting recommendation identifier is the "beauty and skincare". For example, as shown in FIG. 2a, the current live broadcasting room is the shopping live broadcasting room, and the recommendation content label displayed in the live broadcasting room recommendation identifier 201 displayed in the current live broadcasting room is the "beauty and skincare".

Another mode is that, if the category attribute of the target object does not satisfy the preset category label, the live broadcasting category label corresponding to the current live broadcasting room is used as the recommendation content label displayed in the live broadcasting room recommendation identifier. In other words, when the category attribute of the target object does not satisfy the preset category label, the live broadcasting category label corresponding to the current live broadcasting room may be used as the recommendation content label. For example, the preset category label is two category labels of the beauty category and the food category, and the category attribute of the target object is clothing, which does not belong to the two preset category labels mentioned above. Since the live broadcasting category label of the current live broadcasting room is shopping live broadcasting, the "shopping live broadcasting" may be used as the recommendation content label.

Figure 2B:
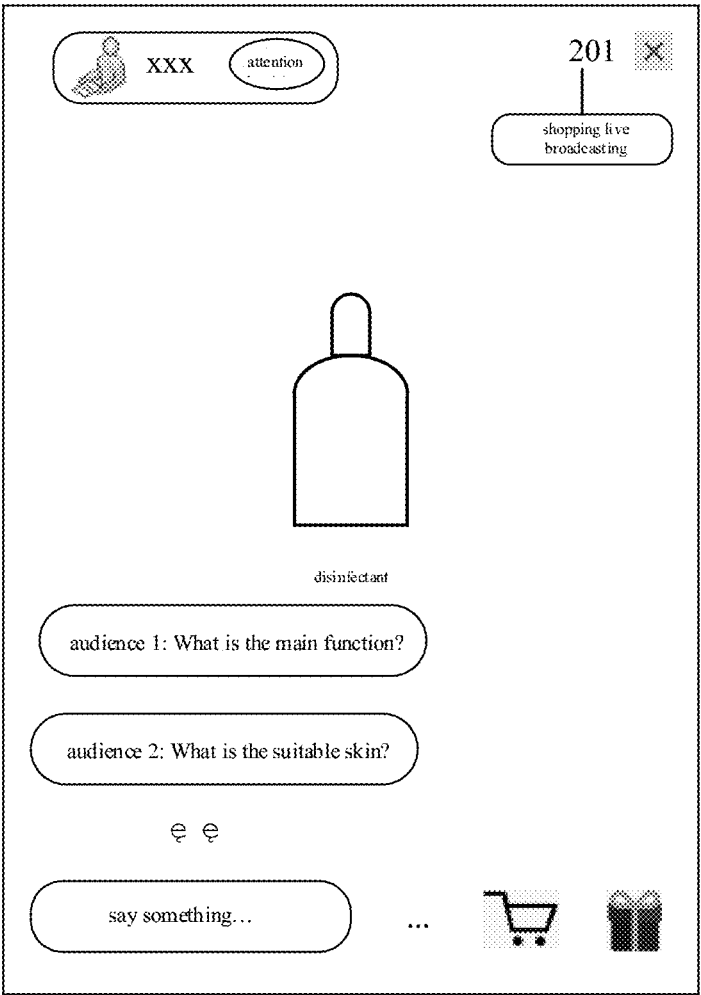
FIG. 2b is a schematic diagram of showing another live broadcasting room recommendation identifier provided by embodiments of the present disclosure.

For example, as shown in FIG. 2b, the current live broadcasting room is a shopping live broadcasting room, and the recommendation content label displayed in the live broadcasting room recommendation identifier 201 displayed in the current live broadcasting room is the "shopping live broadcasting".

The mode of determining the target object in the current live broadcasting room may include:

The first mode is that, if there is a display object corresponding to a preset operation behavior in the current live broadcasting room, the display object is determined as the target object. The preset operation behavior may be a clicking behavior, a bookmarking behavior, an order behavior and etc. Specifically, if there is one of the clicked display objects, bookmarked display objects, or the ordered display objects in the current live broadcasting room, the display object may be determined as the target object. If a plurality of operation behaviors occur simultaneously, the priority may be preset, and the display object corresponding to the operation behavior with the highest priority in the operation behaviors appeared may be used as the target object.

The second mode is that, if there is a display object being explained in the current live broadcasting room, the display object is determined as the target object. Namely, the display object being explained in the current live broadcasting room is determined as the target object.

The third mode is that, a live broadcasting image is collected from the live broadcasting page in the current live broadcasting room, and the display object included in the live broadcasting image is determined as the target objects. Namely, a real-time live broadcasting image of the current live broadcasting room may be collected, and the display object included in the live broadcasting image collected may be determined as the target object. If the live broadcasting image collected includes a plurality of display objects, the display object with the highest display proportion in the live broadcasting image may be determined as the target object.

The fourth mode is that, the display object with corresponding largest number of transactions in the current live broadcasting room is determined as the target object. Namely, the transaction quantity of each display object in the current live broadcasting room may be periodically counted, and the display object with the highest transaction quantity may be determined as the target object. For example, if the product is sold in the current live broadcasting room, the transaction quantity may be a sales quantity of a certain product in the current live broadcasting room within a preset duration (for example, last 1 hour).

The fifth mode is that, the display object with corresponding largest transaction resource value in the current live broadcasting room is determined as the target object. Namely, the transaction resource value of each display object in the current live broadcasting room may be periodically counted, and the display object with the highest transaction resource value may be determined as the target object. For example, if the product is sold in the current live broadcasting room, the transaction resource value may be Gross Merchandise Volume (GMV for short), which refers to the total amount of a certain product sold within a certain period of time.

In specific implementation, corresponding priority of each of the five determination modes mentioned above may be preset. For example, the first determination mode has the highest priority, and is the first priority, and so on. The fifth determination mode has the lowest priority, and is the fifth priority. When the target object is determined, the priority is given to using the determination mode with the first priority to obtain the target object. If the target object may not be obtained, the determination mode with the second priority is used to obtain the target object, and so on until the target object is obtained.

S102: displaying a live broadcasting room recommendation interface corresponding to the recommendation content label in response to a triggering operation on the live broadcasting room recommendation identifier, the live broadcasting room recommendation interface comprises live broadcasting room identifiers of a plurality of recommended live broadcasting rooms.

In this embodiment, after the triggering operation on the live broadcasting room recommendation identifier is received, the live broadcasting room recommendation interface corresponding to the recommendation content label is displayed on the live broadcasting client. The live broadcasting room recommendation interface includes live broadcasting room identifiers of a plurality of live broadcasting rooms, and the display object set in the plurality of the live broadcasting rooms matches with the recommendation content label. Since the recommendation content label is determined according to the target object in the current live broadcasting room, the recommendation content label matches with the target object, thereby the display object set in the plurality of the live broadcasting rooms recommended according to the recommendation content label matches with the target object, live broadcasting rooms similar to the live broadcasting content browsed currently is recommend for the user, and the need of the user who wants to watch the similar content is satisfied.

It may be seen that, if the current live broadcasting room satisfies the preset condition, the live broadcasting room recommendation identifier is displayed on the live broadcasting page of the current live broadcasting room. The recommendation content label displayed in the live broadcasting room recommendation identifier is determined according to the target object in the current live broadcasting room, and the target object is at least one display object in the display object set corresponding to the current live broadcasting room. In response to the triggering operation on the live broadcasting room recommendation identifier, displaying the live broadcasting room recommendation interface corresponding to the recommendation content label. The live broadcasting room recommendation interface includes live broadcasting room identifiers of a plurality of live broadcasting rooms, and the display object set in the plurality of the live broadcasting rooms matches with the recommendation content label. Namely, through the technical schemes provided by this disclosure, when the live broadcasting room is recommended for the user by the technical schemes provided in the present disclosure, the recommendation may be made according to the recommendation content label determined by the target object in the current live broadcasting room watched by the user, thereby the live broadcasting room that more matches with the recommendation content label is recommended for the user, the user's watching need is satisfied, and the user's watching experience is improved.

The live broadcasting room recommendation interface may also include a live broadcasting category label area, the live broadcasting category label area includes a plurality of levels of category labels, and a relationship between the plurality of levels of the category labels is a father-and-son level. Usually, the live broadcasting category label area includes two levels of the category labels, the first-level category label is a father-level category label, and the second-level category label is a son-level category label. The first-level category label includes a live broadcasting category label, such as shopping, singing, and game; and the second-level category label includes a category label corresponding to the display object included in the current live broadcasting room, or a pre-classified category label, such as beauty and skincare, personal care instrument, and luxury, etc. Specifically, when the first-level category label is shopping, its corresponding second-level category label may include beauty and skincare, personal care instrument, luxury and etc.; when the first-level category label is singing, its corresponding second-level category label may include folk song, ballads, rock and etc.; and when the first-level category label is game, its corresponding second-level category label may include action, adventure, leisure and etc.

In response to the triggering operation on the live broadcasting room recommendation identifier, each level of the labels in the live broadcasting room recommendation interface is anchored to the son-level category label corresponding to the live broadcasting category label. During anchoring, not only the live broadcasting category label is anchored, but also a certain son-level category label under the live broadcasting category label is anchored. Specifically, if the recommendation content label is a target category label, not only the son-level category label matched with the target category label is anchored, but also the father-level category label corresponding to the son-level category label is anchored. For example, if the recommendation content label is "beauty and skincare", then in the live broadcasting room recommendation interface, the "beauty and skincare" label is anchored, and its corresponding father-level "shopping" label is also anchored. The anchoring refers to a state in which the live broadcasting category label and its corresponding son-level category label are selected.

Figure 2C:
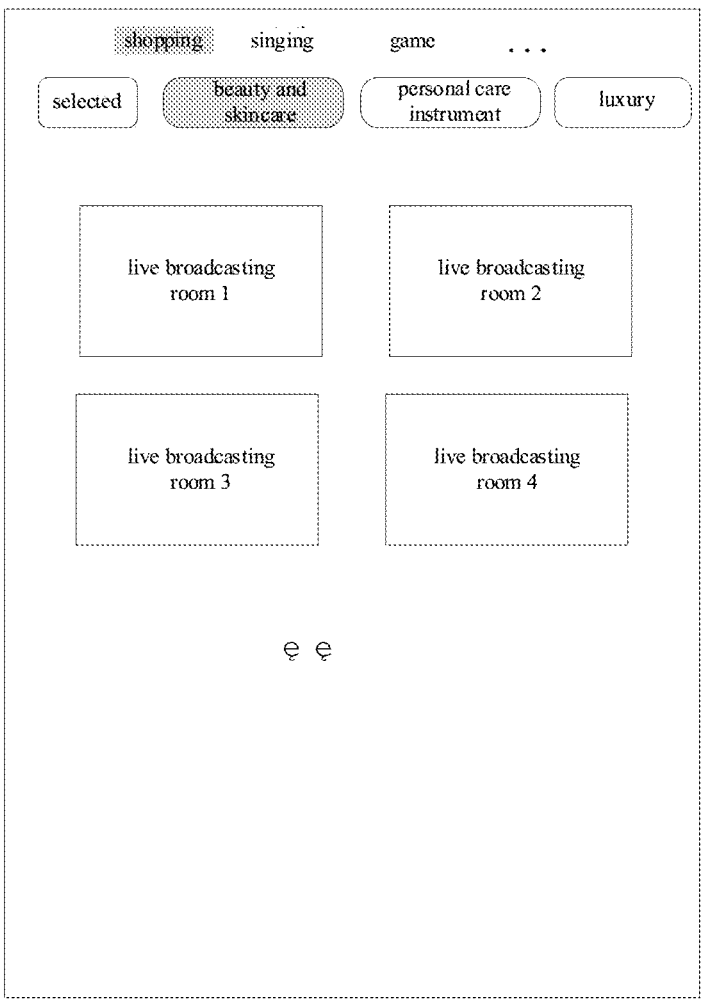
FIG. 2c is a schematic diagram of a live broadcasting room recommendation interface provided by embodiments of the present disclosure.

For example, as shown in FIG. 2c, the live broadcasting category label displayed on the live broadcasting room recommendation interface includes live broadcasting category labels such as shopping, singing, and game. The shopping live broadcasting category label area includes a shopping father-level label and a selected label including 3 son-level labels: a beauty and skincare label, a personal care instrument label, and a luxury label. When user clicks on the live broadcasting room recommendation identifier 201 in FIG. 2a, the shopping category label in the live broadcasting room recommendation interface is anchored, and the "beauty and skincare" son-level label under the shopping category label is also anchored. When user clicks on the live broadcasting room recommendation identifier 201 in FIG. 2b, the shopping category label in the live broadcasting room recommendation interface is anchored. Since the recommendation content label displayed on the live broadcasting room recommendation identifier in FIG. 2b is the live broadcasting room category label corresponding the current live broadcasting room, and in order to indicate a certain son-level label under the live broadcasting category label, "selected" is anchored. The corresponding recommended live broadcasting room under the "selected" label includes the recommended live broadcasting room corresponding to each son-level category label in the other three son-level labels "beauty and skincare", "personal care instrument", and "luxury".

In order to avoid displaying too many son-level category labels in the live broadcasting category label area, as to affect the user's watching experience, the maximum number of the son-level labels included in the live broadcasting category label area may be preset. For example, it includes 4 son-level labels at most. Usually, a plurality of the son-level labels includes the "selected" label, and other son-level labels have a certain association relationship except for the "selected" label. For example, 3 son-level labels of "beauty and skincare", "personal care instrument", and "luxury" are all second-level categories under the "beauty" category.

In some embodiments of the present disclosure, the recommendation content label may include a target category label, for example, the recommendation content label is "beauty and skincare". Alternatively, the recommendation content label includes a live broadcasting category label, for example, the recommendation content label is "shopping— beauty and skincare".

If the number of characters included in the recommendation content label exceeds a preset character threshold, the recommendation content label is displayed on the live broadcasting room recommendation identifier in a mode of circularly displaying, so that the user may browse the complete recommendation content label. If the number of the characters included in the recommendation content label is less than or equal to the preset character threshold, the recommendation content label is fixedly displayed on the live broadcasting room recommendation identifier. For example, the preset character threshold is 4. When the number of the characters included in the recommendation content label is greater than 4 characters, the recommendation content label is displayed in the mode of circularly displaying; and when the number of the characters included in the recommendation content label is less than or equal to 4 characters, there is no need to display circularly, and the recommendation content label is fixedly displayed.

In some embodiments of the present disclosure, in response to the triggering operation for the live broadcasting room recommendation identifier, displaying the live broadcasting room recommendation interface corresponding to the recommendation content label, including: displaying the live broadcasting room recommendation interface corresponding to the recommendation content label in a partial image area in the live broadcasting page of the current live broadcasting room. Namely, the live broadcasting room recommendation interface occupies a partial display area in the live broadcasting page of the current live broadcasting room. For example, after the triggering operation on the live broadcasting room recommendation identifier is received, the live broadcasting room recommendation interface is pulled out from a side surface of the current live broadcasting room, as to display the live broadcasting room recommendation interface in the partial image area in the live broadcasting page of the current live broadcasting room. Alternatively, after the triggering operation on the live broadcasting room recommendation identifier is received, the live broadcasting room recommendation interface is pulled out from an upper side of the current live broadcasting room, as to display the live broadcasting room recommendation interface in the partial image area in the live broadcasting page of the current live broadcasting room.

Figure 2D:
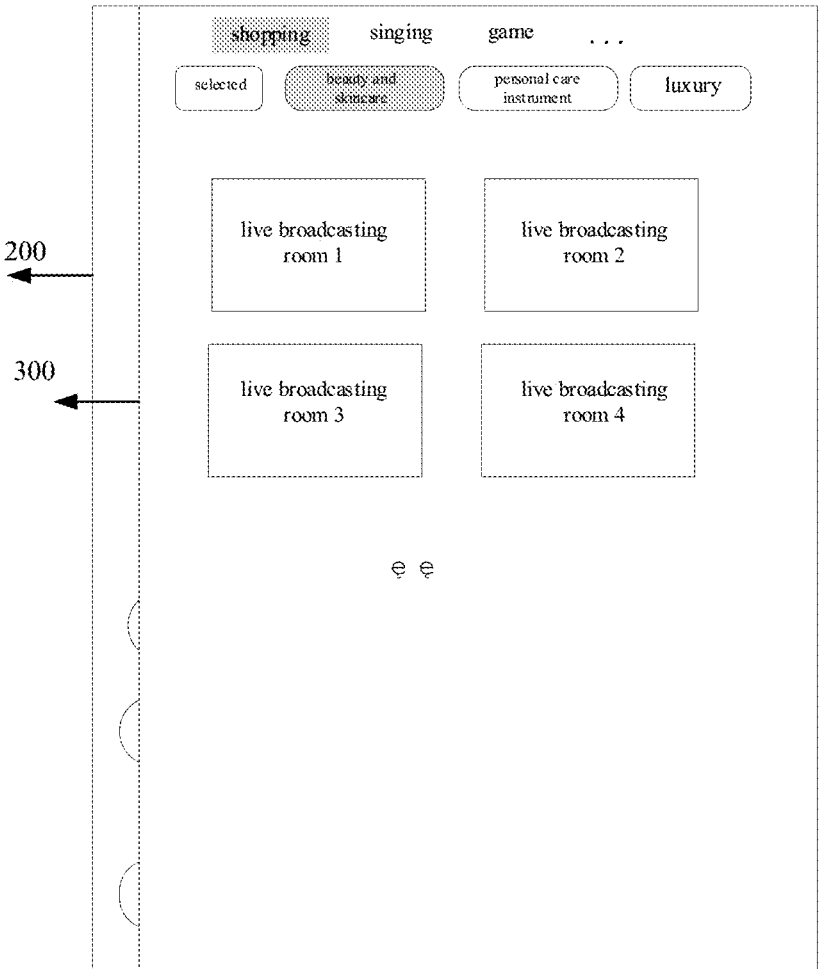
FIG. 2d is a schematic diagram of showing a live broadcasting room recommendation interface provided by embodiments of the present disclosure.

For example, as shown in FIG. 2d, after the triggering operation on the live broadcasting room recommendation identifier is received, the live broadcasting room recommendation interface 300 is pulled out from a right side of the current live broadcasting room, and the live broadcasting room recommendation interface is displayed on the live broadcasting page 200 of the current live broadcasting room.

The live broadcasting room identifier of the recommended live broadcasting room may include live broadcasting room image information, or include the live broadcasting room image information and object information of the display object in the recommended live broadcasting room. The live broadcasting room image information may be a static picture or a video information stream. For example, the static picture may be a cover image corresponding to the recommended live broadcasting room, and the video information stream may be a real-time live broadcasting image of the recommended live broadcasting room. In order to alleviate the pressure on the client, a plurality of the recommended live broadcasting rooms displayed on the live broadcasting room recommendation interface supports that the live broadcasting room image information of one recommended live broadcasting room is real-time live broadcasting image. The object information of the display object refers to basic information used to describe or introduce the display object, for example, it may include one or more of a name of the display object, a picture of the display object, and a resource value required to purchase the display object and etc.

The display object in the recommended live broadcasting room includes at least one of the following:

One is a display object being explained in the recommended live broadcasting room. If there is the display object being explained in the recommended live broadcasting room, the object information of the display object is displayed in the live broadcasting room identifier of the recommended live broadcasting room.

One is a display object with a transaction resource value greater than or equal to a preset transaction resource threshold in the recommended live broadcasting room. The display object of which the transaction resource value is greater than or equal to the preset transaction resource threshold is determined in the recommended live broadcasting room, and the object information of the display object is displayed in the live broadcasting room identifier of the recommended live broadcasting room. If there is a plurality of display objects of which the transaction resource value is greater than or equal to the preset transaction resource threshold, the display object corresponding to the maximum transaction resource value is displayed in the live broadcasting room identifier of the recommended live broadcasting room.

One is a display object with a popularity value greater than a preset popularity threshold, the popularity value is used to reflect the popularity degree of the display object in the recommended live broadcasting room. The popularity value corresponding to the display object may be reflected by a preset operation behavior, and the preset operation behavior may be a clicking behavior, a bookmarking behavior, an order behavior and etc. The times of the preset operation behavior corresponding to the display object are more, and its corresponding popularity value is larger.

The live broadcasting room image information may be displayed on a first image layer, and the object information of the displayed object may be displayed on a second image layer, the second image layer is located on the first image layer. Alternatively, the area of displaying the live broadcasting room identifier is divided into two areas, the first area displays the live broadcasting room image information, and the second area displays the object information of the display object.

Figure 3A:
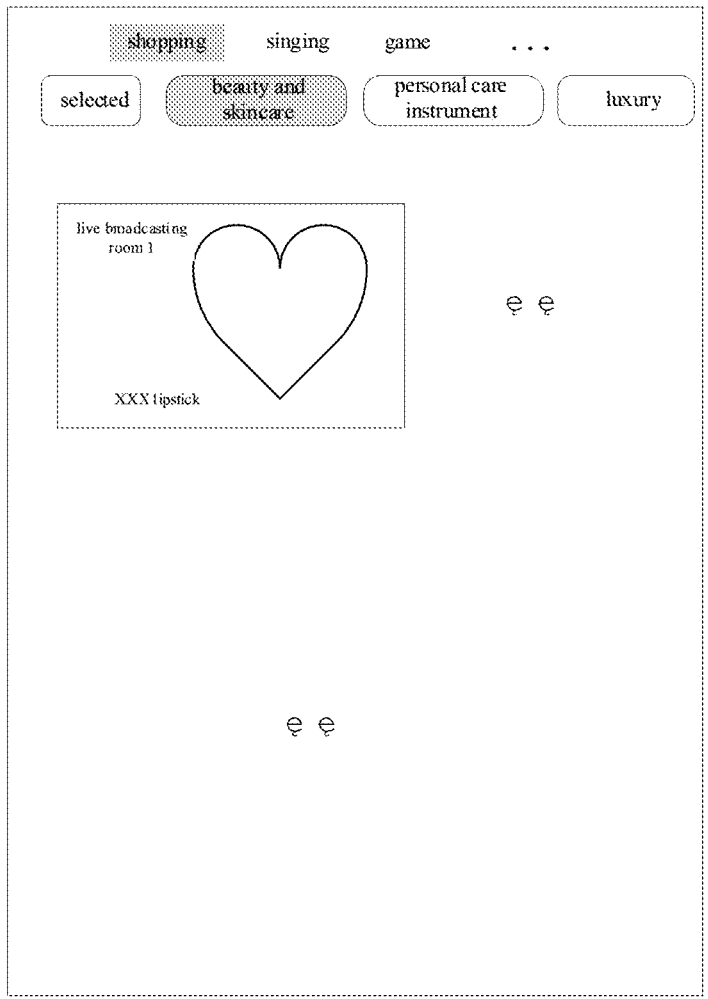
FIG. 3a is a schematic diagram of showing a recommended live broadcasting room provided by embodiments of the present disclosure.
Figure 3B:
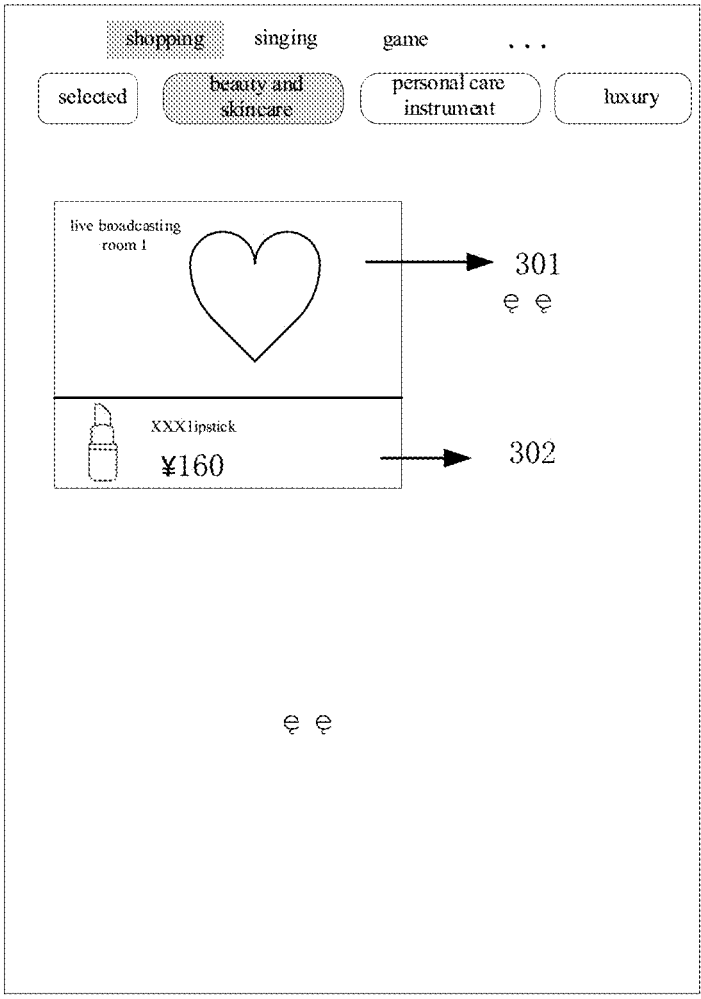
FIG. 3b is a schematic diagram of showing another recommended live broadcasting room provided by embodiments of the present disclosure.

For example, as shown in FIG. 3a, the live broadcasting room image information is the cover image corresponding to the recommended live broadcasting room, the cover image is displayed firstly in a live broadcasting room identifier display area corresponding to the recommended live broadcasting room, and a display object name "xxx lipstick" is displayed on an image layer of the cover image. For another example, as shown in FIG. 3b, the live broadcasting room identifier display area corresponding to the recommended live broadcasting room is divided into a display area 301 and a display area 302, the display area 301 is used to display the cover image of the recommended live broadcasting room, and the display area 302 is used to display the name of display object "xxx lipstick", a picture of display object, and a sales amount.

In some embodiments of the present disclosure, if the live broadcasting room image information is clicked, the live broadcasting page of the recommended live broadcast room corresponding to the live broadcasting room image information is displayed.

If the object information of the display object is clicked, the live broadcasting page of the recommended live broadcast room corresponding to the display object is displayed, or the live broadcasting page of the recommended live broadcast room corresponding to the display object is displayed, and the object information is displayed on the live broadcasting page of the recommended live broadcasting room corresponding to the display object. Namely, when the user clicks on the object information of the display object, entering the live broadcasting page of the recommended live broadcasting room corresponding to the display object. Alternatively, when the user clicks on the object information of the display object, entering the live broadcasting page of the recommended live broadcasting room corresponding to the display object, and the object information of the display object is displayed on the live broadcasting page.

Specifically, if the object information of the display object is clicked, the live broadcasting page of the recommended live broadcasting room corresponding to the display object is displayed, or the live broadcasting page of the recommended live broadcasting room corresponding to the display object is displayed, and the object information is displayed on the live broadcasting page of the recommended live broadcasting room corresponding to the display object, it may include the following situations:

One situation is that, if the object information of the display object is clicked, and the explaining state of the display object is in explaining, the live broadcasting page of the recommended live broadcasting room corresponding to the display object is displayed. Explaining information corresponding to the display object is displayed on the live broadcasting page of the recommended live broadcasting room corresponding to the display object. In explaining may mean that a main broadcaster or an auxiliary broadcaster in the recommended live broadcasting room is explaining the display object; and the explaining information may be presented in the form of an explaining card. When user clicks on the object information of the display object, entering the recommended live broadcasting room, and the explaining card is displayed on the live broadcasting page of the recommended live broadcasting room.

One situation is that, if the object information of the display object is clicked, and the explaining state of the display object is in non-explaining, the live broadcasting page of the recommended live broadcasting room corresponding to the display object is displayed, and the object information is displayed on the live broadcasting page of the recommended live broadcasting room corresponding to the display object. In non-explaining means that the main broadcaster or the auxiliary broadcaster in the recommended live broadcasting room is not explaining the display object, and may include two states: unexplained and explained. In one implementation, display object in explaining may also use this way to display the object information.

Namely, this embodiment may display different information to user for different explaining states of the display object, so that when the explaining state of the display object is in explaining, the explaining information may be displayed to user, so that user may browse the explaining information timely.

In some embodiments of the present disclosure, the object information is displayed on the live broadcasting page of the recommended live broadcasting room corresponding to the display object, which may include the following situations:

One situation is that, on the live broadcasting page of the recommended live broadcasting room corresponding to the display object, an object display list corresponding to the recommended live broadcasting room is displayed, and the display object is anchored in the object display list. In this embodiment, when the object information of the display object clicked is displayed on the live broadcasting page of the recommended live broadcasting room, the object display list may be displayed on the live broadcasting page, and the display object may be anchored in the object display list, so that it easier for users to quickly lock the display object clicked. The mode of anchoring may include highlighting the display object or adding a special background color to display the display object and etc.

One situation is that, detailed object information of the display object is displayed on the live broadcasting page of the recommended live broadcasting room corresponding to the display object. Namely, a detailed information page of the display object clicked is displayed on the live broadcasting page, so that users may grasp detailed information of the display object by the detailed information page.

One situation is that, on the live broadcasting page of the recommended live broadcasting room corresponding to the display object, the object display list corresponding to the recommended live broadcasting room is displayed, and if the display position of the display object is not on a first screen of the object display list, the display position of the display object is adjusted to the first screen of the object display list. In this embodiment, if the display object clicked is not on the first screen of the object display list, the display position of the display object may be adjusted to the first screen of the object display list, so that users may quickly lock the display object clicked.

Further, if the object display list is retriggered to display in the recommended live broadcasting room, the display position of the display object is restored. In other words, when users pull up the object display list again in the recommended live broadcasting room, the display object may return to the original display position for displaying.

Based on the above method examples, embodiments of the present disclosure provide an apparatus of recommending a live broadcasting room and an electronic device, and it is described below in combination with the drawings.

Figure 4:
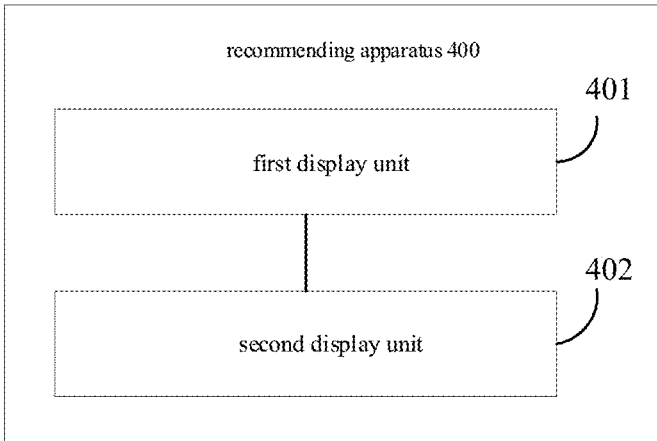
FIG. 4 is a structural diagram of an apparatus of recommending a live broadcasting room provided by embodiments of the present disclosure.

Referring to FIG. 4, this figure is a structure diagram of an apparatus of recommending a live broadcasting room provided in embodiments of the present disclosure. As shown in FIG. 4, the apparatus 400 may include: a first display unit 401 and a second display unit 402.

The first display unit 401, configured to, if a current live broadcasting room satisfies a preset condition, display a live broadcasting room recommendation identifier on a live broadcasting page of the current live broadcasting room, a recommendation content label displayed in the live broadcasting room recommendation identifier is determined according to a target object in the current live broadcasting room, and the target object is at least one display object in a display object set corresponding to the current live broadcasting room; and the second display unit 402, configured to, in response to a triggering operation on the live broadcasting room recommendation identifier, display a live broadcasting room recommendation interface corresponding to the recommendation content label, the live broadcasting room recommendation interface includes live broadcasting room recommendation identifiers of a plurality of recommended live broadcasting rooms, and the display object set in the plurality of the recommended live broadcasting rooms matches with the recommendation content label.

In some implementations, the preset condition includes one or more of the following:

a display object in the current live broadcasting room is clicked; and the category and/or quantity of the display object in the display object set corresponding to the current live broadcasting room is changed.

In some implementations, determining the recommendation content label displayed in the live broadcasting room recommendation identifier includes:

if a category attribute of the target object satisfies a preset category label, a target category label is determined according to the category attribute of the target object, and the target category label is used as the recommendation content label displayed in the live broadcasting room recommendation identifier; and if the category attribute of the target object does not satisfy the preset category label, a live broadcasting category label corresponding to the current live broadcasting room is used as the recommendation content label displayed in the live broadcasting room recommendation identifier.

In some implementations, the live broadcasting room recommendation interface further includes a live broadcasting category label area, the live broadcasting category label area includes a plurality of levels of category labels, and a relationship between the plurality of levels of the category labels is a father-and-son level; and each level of the labels is anchored to a son-level category label corresponding to the live broadcasting category label.

In some implementations, the recommendation content label includes the target category label, or the live broadcasting category label;

if the number of characters included in the recommendation content label exceeds a preset character threshold, the recommendation content label is displayed on the live broadcasting room recommendation identifier in a mode of circularly displaying; and if the number of the characters included in the recommendation content label is less than or equal to the preset character threshold, the recommendation content label is fixedly displayed on the live broadcasting room recommendation identifier.

In some implementations, determining the target object in the current live broadcasting room includes:

if there is a display object corresponding to a preset operation behavior in the current live broadcasting room, the display object is determined as the target object; and if there is a display object being explained in the current live broadcasting room, the display object is determined as the target object;

a live broadcasting image on the live broadcasting page of the current live broadcasting room is collected, and the display object included in the live broadcasting image is determined as the target object;

the display object with corresponding largest number of transactions in the current live broadcasting room is determined as the target object; and the display object with corresponding largest transaction resource value in the current live broadcasting room is determined as the target object.

In some implementations, the second display unit 402 is specifically configured to display the live broadcasting room recommendation interface corresponding to the recommendation content label in a partial image area in the live broadcasting page of the current live broadcasting room.

In some implementations, the live broadcasting room identifier of the recommended live broadcasting room includes live broadcasting room image information, or the live broadcasting room image information and object information of the display object in the recommended live broadcasting room.

In some implementations, the display object in the recommended live broadcasting room includes at least one of the following:

a display object being explained in the recommended live broadcasting room;

a display object with a transaction resource value greater than or equal to a preset transaction resource threshold in the recommended live broadcasting room; and a display object with a popularity value greater than a preset popularity threshold in the recommended live broadcasting room.

In some implementations, the apparatus further includes: a third display unit.

The third display unit is configured to, if clicking on the live broadcasting room image information, display the live broadcasting page of the recommended live broadcasting room corresponding to the live broadcasting room image information; and if clicking on the object information of the display object, display the live broadcasting page of the recommended live broadcasting room corresponding to the display object, or display the live broadcasting page of the recommended live broadcasting room corresponding to the display object, and display the object information on the live broadcasting page of the recommended live broadcasting room corresponding to the display object.

In some implementations, the third display unit is specifically configured to, if the object information of the display object is clicked on and the explaining state of the display object is in explaining, display the live broadcasting page of the recommended live broadcasting room corresponding to the display object, explaining information corresponding to the display object is displayed on the live broadcasting page of the recommended live broadcasting room corresponding to the display object; and if the object information of the display object is clicked on and the explaining state of the display object is in non-explaining, display the live broadcasting page of the recommended live broadcasting room corresponding to the display object, and display the object information on the live broadcasting page of the recommended live broadcasting room corresponding to the display object.

In some implementations, the third display unit is specifically configured to display an object display list corresponding to the recommended live broadcasting room, and anchor to the display object in the object display list, on the live broadcasting page of the recommended live broadcasting room corresponding to the display object; or, display detailed object information of the display object on the live broadcasting page of the recommended live broadcasting room corresponding to the display object; or, display the object display list corresponding to the recommended live broadcasting room, and if a display position of the display object is not on a first screen of the object display list, adjust the display position of the display object to the first screen of the object display list, on the live broadcasting page of the recommended live broadcasting room corresponding to the display object.

It should be noted that specific implementation of each unit in this embodiment may be referred to the relevant description in the above method embodiments. The division of the units in the embodiments of the present disclosure is schematic and only serves as one logical functional division. In actual implementation, there may be other division modes. The functional units in the embodiments of the present disclosure may be integrated into one processing unit, or each unit may exist separately and physically, or two or more units may be integrated into one unit. For example, in the above embodiment, the first display unit and the second display unit may be the same unit or different units. The integrated unit mentioned above may be achieved by using a form of hardware, or achieved by using a form of a software functional unit.

Figure 5:
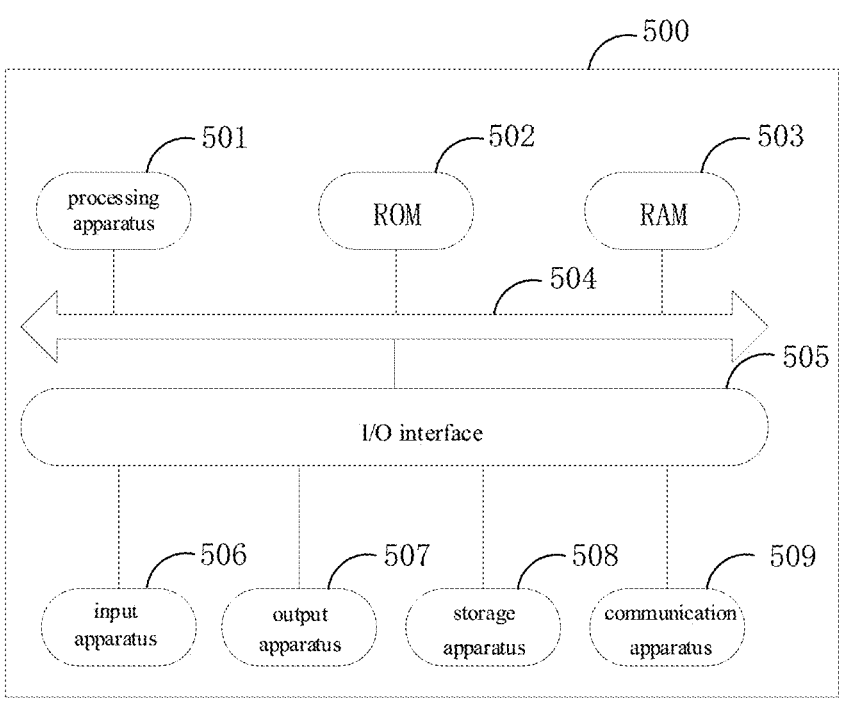
FIG. 5 is a schematic structural diagram of an electronic device provided by embodiments of the present disclosure.

Referring to FIG. 5, which shows a structure schematic diagram of an electronic device 500 suitable for achieving the embodiments of the present disclosure. The terminal device in the embodiments of the present disclosure may include but not limited to a mobile terminal such as a mobile phone, a notebook computer, a digital radio broadcasting receiver, a personal digital assistant (PDA), a portable android device (PAD), a portable multimedia player (PMP), a vehicle terminal (such as a vehicle navigation terminal), and a fixed terminal such as a digital television (TV) and a desktop computer. The electronic device shown in FIG. 5 is only an example and should not impose any limitations on the functions and use scopes of the embodiments of the present disclosure.

As shown in FIG. 5, the electronic device 500 may include a processing apparatus (such as a central processing unit, and a graphics processor) 501, which may execute various appropriate actions and processes according to a program stored in a read-only memory (ROM) 502 or a program loaded from a storage apparatus 508 to a random-access memory (RAM) 503. In RAM 503, various programs and data required for operations of the electronic device 500 are also stored. The processing apparatus 501, ROM 502, and RAM 503 are connected to each other by a bus 504. An input/output (I/O) interface 505 is also connected to the bus 504.

Generally, the following apparatuses may be connected to the I/O interface 505: an input apparatus 506 such as a touch screen, a touchpad, a keyboard, a mouse, a camera, a microphone, an accelerometer, and a gyroscope; an output apparatus 507 such as a liquid crystal display (LCD), a loudspeaker, and a vibrator; a storage apparatus 508 such as a magnetic tape, and a hard disk drive; and a communication apparatus 509. The communication apparatus 509 may allow the electronic device 500 to wireless-communicate or wire-communicate with other devices so as to exchange data. Although FIG. 5 shows the electronic device 500 with various apparatuses, it should be understood that it is not required to implement or possess all the apparatuses shown. Alternatively, it may implement or possess the more or less apparatuses.

Specifically, according to the embodiments of the present disclosure, the process described above with reference to the flow diagram may be achieved as a computer software program. For example, embodiments of the present disclosure include a computer program product, which includes a computer program loaded on a non-transient computer-readable medium, and the computer program includes program codes for executing the method shown in the flow diagram. In such embodiments, the computer programs may be downloaded and installed from the network by the communication apparatus 509, or installed from the storage apparatus 508, or installed from ROM 502. When the computer program is executed by the processing apparatus 501, the above functions defined in the method in the embodiments of the present disclosure are performed.

The electronic device provided in the embodiments of the present disclosure belongs to the same inventive concept as the method provided in the above embodiments, technical details that are not fully described in this embodiment may be referred to the above embodiments, and this embodiment has the same beneficial effects as the above embodiments.

Embodiments of the present disclosure provides a computer storage medium, computer programs are stored on it, and the programs achieves the method provided in the above embodiments when executed by a processor.

Embodiments of the present disclosure provide a computer-readable storage medium, instructions are stored in the computer-readable storage medium, when the instructions are run on a device, the device is caused to execute the method according to the above embodiments. The computer-readable storage medium may be a non-transitory computer-readable storage medium.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not limited to: an electric connector with one or more wires, a portable computer magnetic disk, a hard disk drive, a random-access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or etc., or any suitable combinations of the above.

In some implementations, a client and a server may be communicated by using any currently known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The above computer-readable medium may be contained in the above electronic device; and it may also exist separately without being assembled into the electronic device.

The above computer-readable medium carries one or more programs, and when the above one or more programs are executed by the electronic device, the electronic device may execute the above method.

The computer program code for executing the operation of the present disclosure may be written in one or more programming languages or combinations thereof, the above programming language includes but not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an disclosure specific integrated circuit (ASIC), an disclosure specific standard product (ASSP), a system on chip (SOC), a complex programmable logic device (CPLD) and etc.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

It should be noted that each embodiment in the description is described in a progressive manner, and each embodiment focuses on the differences from other embodiments. The same and similar portions between the embodiments may be referred to each other. For the system or apparatus disclosed in the embodiments, the description is relatively simple since it corresponds to the method disclosed in the embodiments. Please refer to a method section for relevant information.

It should be understood that in the present disclosure, "at least one" refers to one or more, and "plurality" refers to two or more. "and/or" is used to describe an association relationship of associated objects, and it represents that there may be three types of relationships. For example, "A and/or B" may represent: only A exists, only B exists, and both A and B exist, A and B may be singular or plural. The character "/" generally represents that the front and rear associated objects are an "or" relationship. "At least one of the following" or similar expressions refer to any combinations of these items, including any combinations of single or plural items. For example, at least one of a, b, or c may represent: a, b, c, "a and b", "a and c", "b and c", or "a and b and c", a, b, and c may be single or multiple.

It should also be noted that in this article, relationship terms such as first and second are only used to distinguish one entity or operation from another entity or operation, and do not necessarily require or imply any actual relationship or order between these entities or operations. Moreover, the terms "including", "containing", or any other variations thereof are intended to encompass non-exclusive inclusion, such that a process, a method, an item, or a device that includes a series of elements not only includes those elements, but also other elements that are not explicitly listed, or also includes elements inherent in such a process, method, item, or device. In the case without more limitations, an element limited by the statement "including one . . . " does not exclude the existence of other identical elements in the process, method, item, or device that includes the element.

The steps of the method or algorithm described in combination with the embodiments disclosed in this article may be directly implemented by using hardware, a software module executed by the processor, or a combination of the two. The software module may be placed in RAM, memory, ROM, electrically programmable ROM, electrically erasable programmable ROM, register, hard disk, removable disk, CD-ROM, or any other form of the storage medium well-known in the technical field.

The above description of the disclosed embodiments enables those skilled in the art to implement or use the present disclosure. The various modifications to these embodiments may be apparent to those skilled in the art, and the general principles defined in this article may be achieved in other embodiments without departing from the spirit or scope of the present disclosure. Therefore, the present disclosure may not be limited to the embodiments shown, but rather to the widest scope consistent with the principles and novel features disclosed.

The invention claimed is:

1. A method of recommending a live broadcasting room, comprising:
   displaying a live broadcasting page of a current live broadcasting room, wherein the current live broadcasting room comprises a target object, and the target object is a display object in a set of display objects corresponding to the current live broadcasting room;
   in response to the current live broadcasting room satisfying a preset condition, displaying a live broadcasting room recommendation identifier on the live broadcasting page of the current live broadcasting room, wherein the live broadcasting room recommendation identifier is configured to display a recommendation content label;
   displaying the recommendation content label in the live broadcasting room recommendation identifier, wherein the recommendation content label is determined based on the target object in the current live broadcasting room; and
   displaying a live broadcasting room recommendation interface corresponding to the recommendation content label in response to a triggering operation on the live broadcasting room recommendation identifier in which the recommendation content label is displayed, wherein the live broadcasting room recommendation interface comprises live broadcasting room identifiers of a plurality of recommended live broadcasting rooms, display objects in the plurality of recommended live broadcasting rooms match the recommendation content label.

2. The method according to claim 1, wherein the preset condition comprises one or more of the following:
   a display object in the current live broadcasting room is clicked; and
   a category and/or quantity of the display object in the display object set corresponding to the current live broadcasting room is changed.

3. The method according to claim 2, wherein a method for determining the recommendation content label displayed in the live broadcasting room recommendation identifier comprises:
   in response to a category attribute of the target object conforming to a preset category label, determining a target category label according to the category attribute of the target object and using the target category label as the recommendation content label displayed in the live broadcasting room recommendation identifier; and
   in response to the category attribute of the target object not conforming to the preset category label, using a live broadcasting category label corresponding to the current live broadcasting room as the recommendation content label displayed in the live broadcasting room recommendation identifier.

4. The method according to claim 2, wherein a method for determining the target object in the current live broadcasting room comprises one or more of the following:
   in response to a display object corresponding to a preset operation behavior existing in the current live broadcasting room, determining the display object corresponding to the preset operation behavior as the target object;
   in response to a display object that is being explained existing in the current live broadcasting room, determining the display object that is being explained as the target object;
   obtaining a live broadcasting image on the live broadcasting page of the current live broadcasting room, and determining a display object comprised in the live broadcasting image as the target object;
   determining a display object corresponding to largest number of transactions in the current live broadcasting room as the target object; and
   determining a display object corresponding to a largest transaction resource value in the current live broadcasting room as the target object.

5. The method according to claim 2, wherein the displaying a live broadcasting room recommendation interface corresponding to the recommendation content label in response to the triggering operation on the live broadcasting room recommendation identifier, comprises:
   displaying the live broadcasting room recommendation interface corresponding to the recommendation content label in a partial image area in the live broadcasting page of the current live broadcasting room.

6. The method according to claim 3, wherein the live broadcasting room recommendation interface further comprises a live broadcasting category label area, the live broadcasting category label area comprises a plurality of levels of category labels, and a relationship between the plurality of levels of the category labels is a father-and-son level relationship; and each level of the category labels is anchored to a son-level category label corresponding to the live broadcasting category label.

7. The method according to claim 6, wherein the recommendation content label comprises the target category label, or the live broadcasting category label;

the recommendation content label is displayed on the live broadcasting room recommendation identifier in a mode of circularly displaying, when a quantity of characters comprised in the recommendation content label exceeds a preset character threshold; and the recommendation content label is fixedly displayed on the live broadcasting room recommendation identifier, when the quantity of the characters comprised in the recommendation content label is less than or equal to the preset character threshold.

8. The method according to claim 1, wherein a method for determining the recommendation content label displayed in the live broadcasting room recommendation identifier comprises:

in response to a category attribute of the target object conforming to a preset category label, determining a target category label according to the category attribute of the target object and using the target category label as the recommendation content label displayed in the live broadcasting room recommendation identifier; and in response to the category attribute of the target object not conforming to the preset category label, using a live broadcasting category label corresponding to the current live broadcasting room as the recommendation content label displayed in the live broadcasting room recommendation identifier.

9. The method according to claim 8, wherein the live broadcasting room recommendation interface further comprises a live broadcasting category label area, the live broadcasting category label area comprises a plurality of levels of category labels, and a relationship between the plurality of levels of the category labels is a father-and-son level relationship; and each level of the category labels is anchored to a son-level category label corresponding to the live broadcasting category label.

10. The method according to claim 9, wherein the recommendation content label comprises the target category label, or the live broadcasting category label;

in response to a quantity of characters comprised in the recommendation content label exceeding a preset character threshold, the recommendation content label is displayed on the live broadcasting room recommendation identifier in a mode of circularly displaying; and in response to the quantity of the characters comprised in the recommendation content label being less than or equal to the preset character threshold, the recommendation content label is fixedly displayed on the live broadcasting room recommendation identifier.

11. The method according to claim 1, wherein a method for determining the target object in the current live broadcasting room comprises one or more of the following:

in response to a display object corresponding to a preset operation behavior existing in the current live broadcasting room, determining the display object corresponding to the preset operation behavior as the target object;

in response to a display object that is being explained existing in the current live broadcasting room, determining the display object that is being explained as the target object;

obtaining a live broadcasting image on the live broadcasting page of the current live broadcasting room, and determining a display object comprised in the live broadcasting image as the target object;

determining a display object corresponding to largest number of transactions in the current live broadcasting room as the target object; and determining a display object corresponding to a largest transaction resource value in the current live broadcasting room as the target object.

12. The method according to claim 1, wherein the displaying a live broadcasting room recommendation interface corresponding to the recommendation content label in response to the triggering operation on the live broadcasting room recommendation identifier, comprises:

displaying the live broadcasting room recommendation interface corresponding to the recommendation content label in a partial image area in the live broadcasting page of the current live broadcasting room.

13. The method according to claim 1, wherein one of the live broadcasting room identifiers comprises live broadcasting room image information, or the live broadcasting room image information and object information of a display object in a recommended live broadcasting room among the plurality of recommended live broadcasting rooms.

14. The method according to claim 13, wherein the display object in the recommended live broadcasting room comprises at least one of the following:

a display object that is being explained in the recommended live broadcasting room;

a display object with a transaction resource value greater than or equal to a preset transaction resource threshold in the recommended live broadcasting room; and a display object with a popularity value greater than a preset popularity threshold in the recommended live broadcasting room.

15. The method according to claim 13, further comprising:

in response to clicking on the live broadcasting room image information, displaying a live broadcasting page of a recommended live broadcasting room corresponding to the live broadcasting room image information; and in response to clicking on the object information of the display object, displaying a live broadcasting page of the recommended live broadcasting room corresponding to the display object, or displaying the live broadcasting page of the recommended live broadcasting room corresponding to the display object and displaying the object information of the display object on the live broadcasting page of the recommended live broadcasting room corresponding to the display object.

16. The method according to claim 15, wherein the in response to clicking on object information of a display object, displaying a live broadcasting page of a recommended live broadcasting room corresponding to the display object, or displaying the live broadcasting page of the recommended live broadcasting room corresponding to the display object and displaying the object information of the display object on the live broadcasting page of the recommended live broadcasting room corresponding to the display object, comprises:

in response to clicking on the object information of the display object and an explaining state of the display object is a state of being explained, displaying the live broadcasting page of the recommended live broadcasting room corresponding to the display object, wherein explaining information corresponding to the display object is displayed on the live broadcasting page of the recommended live broadcasting room corresponding to the display object; and in response to clicking on the object information of the display object and the explaining state of the display object is a state of not being explained, displaying the live broadcasting page of the recommended live broadcasting room corresponding to the display object and displaying the object information of the display object on the live broadcasting page of the recommended live broadcasting room corresponding to the display object.

17. The method according to claim 16, wherein the displaying the object information of the display object on the live broadcasting page of the recommended live broadcasting room corresponding to the display object, comprises:

displaying an object display list corresponding to the recommended live broadcasting room corresponding to the display object on the live broadcasting page of the recommended live broadcasting room corresponding to the display object, and anchoring to the display object in the object display list; or, displaying detailed object information of the display object on the live broadcasting page of the recommended live broadcasting room corresponding to the display object; or, displaying the object display list corresponding to the recommended live broadcasting room corresponding to the display object on the live broadcasting page of the recommended live broadcasting room corresponding to the display object, and adjusting a display position of the display object to a first screen of the object display list in response to the display position of the display object being not on the first screen of the object display list.

18. The method according to claim 15, wherein the displaying the object information of the display object on the live broadcasting page of the recommended live broadcasting room corresponding to the display object, comprises:

displaying an object display list corresponding to the recommended live broadcasting room corresponding to the display object on the live broadcasting page of the recommended live broadcasting room corresponding to the display object, and anchoring to the display object in the object display list; or, displaying detailed object information of the display object on the live broadcasting page of the recommended live broadcasting room corresponding to the display object; or, displaying the object display list corresponding to the recommended live broadcasting room corresponding to the display object on the live broadcasting page of the recommended live broadcasting room corresponding to the display object, and adjusting a display position of the display object to a first screen of the object display list in response to the display position of the display object being not on the first screen of the object display list.

19. An electronic device, comprising: a processor and a memory; wherein the memory is configured to store instructions or computer programs; and the processor is configured to execute the instructions or the computer programs in the memory, to enable the electronic device to perform operations comprising:

displaying a live broadcasting page of a current live broadcasting room, wherein the current live broadcasting room comprises a target object, and the target object is a display object in a set of display objects corresponding to the current live broadcasting room;

in response to the current live broadcasting room satisfying a preset condition, displaying a live broadcasting room recommendation identifier on the live broadcasting page of the current live broadcasting room in response to the current live broadcasting room satisfying a preset condition, wherein the live broadcasting room recommendation identifier is configured to display a recommendation content label;

displaying the recommendation content label displayed in the live broadcasting room recommendation identifier, wherein the recommendation content label is determined based on according to the target object in the current live broadcasting room, the target object is at least one display object in a display object set corresponding to the current live broadcasting room; and displaying a live broadcasting room recommendation interface corresponding to the recommendation content label in response to a triggering operation on the live broadcasting room recommendation identifier in which the recommendation content label is displayed, wherein the live broadcasting room recommendation interface comprises live broadcasting room identifiers of a plurality of recommended live broadcasting rooms, display objects in the plurality of recommended live broadcasting rooms matches with the recommendation content label.

20. A non-transitory computer-readable storage medium, wherein instructions are stored in the computer-readable storage medium, when the instructions are run on a device, the device is caused to execute operations comprising:

displaying a live broadcasting page of a current live broadcasting room, wherein the current live broadcasting room comprises a target object, and the target object is a display object in a set of display objects corresponding to the current live broadcasting room;

in response to the current live broadcasting room satisfying a preset condition, displaying a live broadcasting room recommendation identifier on the live broadcasting page of the current live broadcasting room in response to the current live broadcasting room satisfying a preset condition, wherein the live broadcasting room recommendation identifier is configured to display a recommendation content label;

displaying the recommendation content label displayed in the live broadcasting room recommendation identifier, wherein the recommendation content label is determined based on according to the target object in the current live broadcasting room, the target object is at least one display object in a display object set corresponding to the current live broadcasting room; and displaying a live broadcasting room recommendation interface corresponding to the recommendation content label in response to a triggering operation on the live broadcasting room recommendation identifier in which the recommendation content label is displayed, wherein the live broadcasting room recommendation interface comprises live broadcasting room identifiers of a plurality of recommended live broadcasting rooms, display objects in the plurality of recommended live broadcasting rooms matches with the recommendation content label.

* * * * *